(No Model.) 3 Sheets—Sheet 1.
A. SWEETSER.
APPARATUS FOR MAKING OXYGEN.
No. 576,915. Patented Feb. 9, 1897.
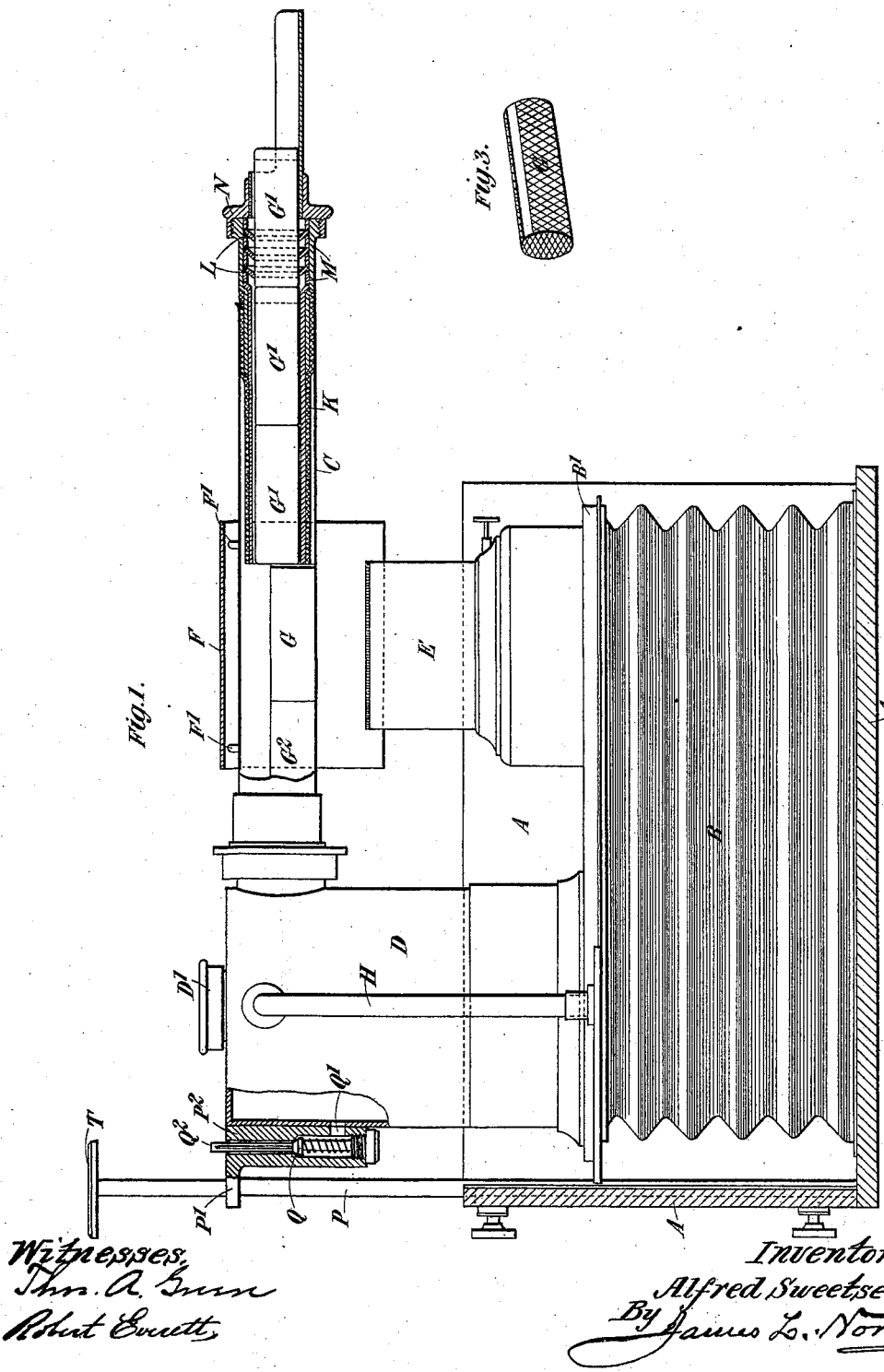

(No Model.)  3 Sheets—Sheet 2.
A. SWEETSER.
APPARATUS FOR MAKING OXYGEN.
No. 576,915. Patented Feb. 9, 1897.
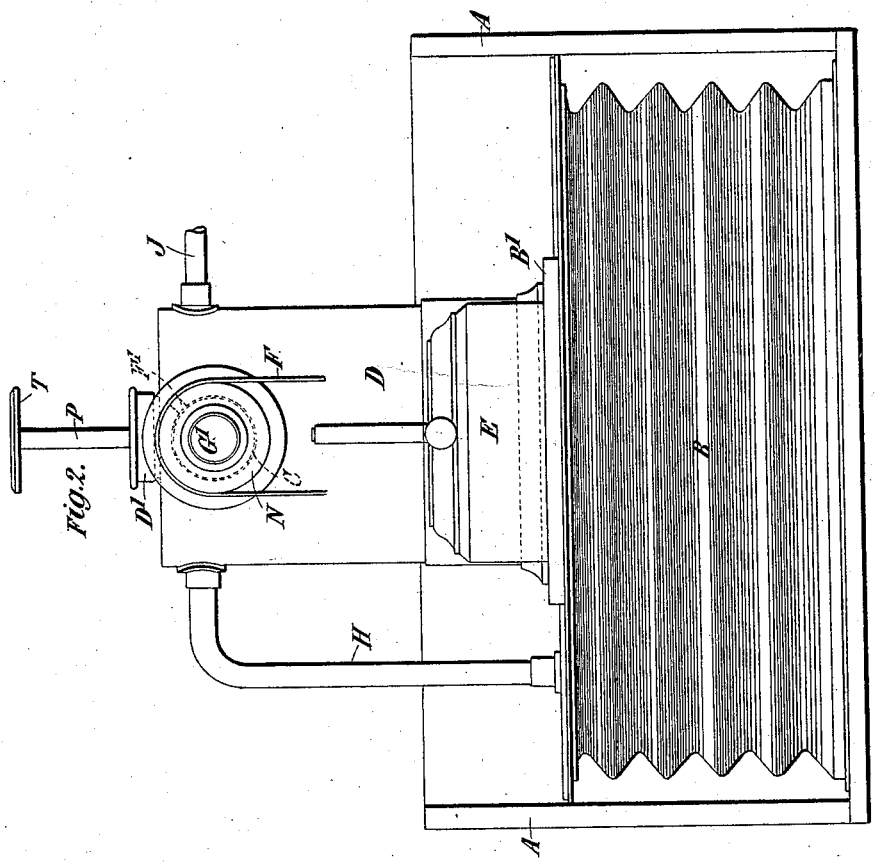

(No Model.)  3 Sheets—Sheet 3.
A. SWEETSER.
APPARATUS FOR MAKING OXYGEN.
No. 576,915.  Patented Feb. 9, 1897.
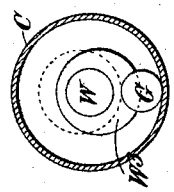
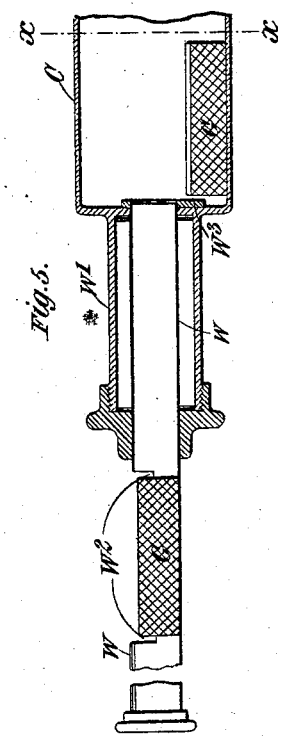
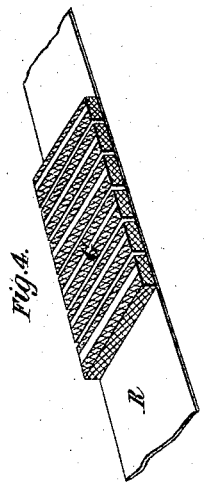
Witnesses.  Inventor.
Alfred Sweetser.
By James L. Norris.
Atty.

UNITED STATES PATENT OFFICE.

ALFRED SWEETSER, OF LONDON, ENGLAND.

APPARATUS FOR MAKING OXYGEN.

SPECIFICATION forming part of Letters Patent No. 576,915, dated February 9, 1897.

Application filed February 25, 1896. Serial No. 580,633. (No model.)

*To all whom it may concern:*

Be it known that I, ALFRED SWEETSER, consulting engineer, a subject of the Queen of Great Britain, residing at 67 Croxted Road, West Dulwich, London, county of Surrey, England, have invented certain new and useful Improvements Relating to the Production of Oxygen Gas and Apparatus Therefor, of which the following is a specification, reference being had to the accompanying drawings.

This invention has for its object an improved means for producing oxygen gas in readily-regulated quantities for meeting the requirements of operators of the oxyhydrogen lime-light of optical lanterns, also for use in hospitals and for other purposes.

According to my invention I produce the oxygen gas from chlorate of potash or other suitable substance that when heated gives off oxygen, the said substance being made up into cakes, rods, or slabs of conveniently small dimensions, each cake, rod, or slab being wholly or partially inclosed in a casing formed of asbestos cloth or other suitable fabric to prevent contact between the oxygen-yielding substance and the hot metal tube in which the gas is generated. I generate the gas by passing the aforesaid cakes, rods, or slabs of oxygen-yielding substance successively through a heated tube which communicates with a receiver for holding the gas.

The chief feature of my invention is the continuity of the operation, the cakes being fed into and through the generating-tube in succession and the spent cakes being at the same time delivered into a receptacle adapted to receive them or passed out of the tube without necessitating any stoppage of the generation of gas. The cakes may be independent of each other, or they may be connected together by flexible connections to form a chain of cakes, or they may be mounted on a flexible belt or band for convenience in passing them into and through the tube. The generating-tube may be provided with an elastic washer or with two or more such washers, through which the cakes can be successively passed, or in lieu of washers an "air-lock" or similar device may be used to allow of the introduction of the cakes, while preventing the escape of gas. In order to confine the generation of the gas to the cake or cakes which is or are located in the hottest part of the tube, I sometimes shield the succeeding cakes by an asbestos or like sleeve that protects them from the heat and prevents the generation of gas therefrom while they remain in the sleeve. At other times for the same purpose I separate the adjoining cakes by a block of asbestos or other non-conductor of heat.

In the accompanying drawings I have shown a convenient form of apparatus for carrying my invention into practice, the said apparatus being constructed for the use of separate pieces of oxygen-yielding substance made up into the form of rods.

Figure 1 is a side elevation, partly in section, of the apparatus. Fig. 2 is a front elevation of the same. Fig. 3 is a perspective view of one of the rods of oxygen-yielding substance inclosed in asbestos cloth, as hereinafter described. Fig. 4 is a perspective view, on an enlarged scale, of a number of flat cakes mounted on a flexible belt. Fig. 5 is a longitudinal section of a special form of apparatus constituting an air-lock for introducing the rods into the generating-tube. Fig. 6 is a transverse section on the line $xx$, Fig. 5. Figs. 7 and 8 are views of two rods of oxygen-yielding substance furnished with end pieces to prevent the conduction of heat from one rod to the next. In Fig. 8 the end pieces are shown in section.

Like letters of reference denote similar parts throughout the figures.

A is a box for inclosing the apparatus and serving as a packing-box therefor. The front of the box is removed to show the expansible gas-holder B for storing the generated gas.

C is the generating or heating tube connected to the side wall of and communicating with a chamber D, that forms a receptacle for the spent cakes. The said chamber is supported on the rigid top or cover B' of the holder B.

E is a lamp also resting on the top or cover B' and situated immediately under the tube C.

By supporting the apparatus on the top of the expansible holder, as above described, the necessary pressure is obtained in the holder without the employment of separate weights for compressing the holder. In some instances, however, it will be necessary to add separate weights where more pressure is required than would be produced by the weight of the apparatus alone.

F is a removable bent sheet-metal cover placed over the tube C and furnished with short inwardly-projecting supporting-pins F', that rest on the said tube. The cover F serves to concentrate upon the tube the heat given off by the lamp and to shield the operator.

G is a cake of chlorate of potash or other oxygen-yielding substance within the tube C at a point immediately above the lamp E, and therefore in the hottest part of the tube. It is this cake that parts with its oxygen when the tube is heated.

G' G' G' are three other cakes ready to take successively the place of the cake G when the latter is spent.

$G^2$ is a spent cake which, on the introduction of another cake into the tube, is pushed forward into the chamber D. The said chamber is made large enough to hold a number of such cakes. At the top of the chamber D is an opening closed by a screw-cap D'. On removing this cap the spent cakes may be taken out of the chamber when required.

H is a pipe for conducting the generated oxygen gas to the holder B.

J is a pipe for leading the gas to the burner.

K is a sleeve made of asbestos or other suitable material lined with a metal tube to afford support therefor and fitting tightly in the tube C or removably secured thereto in any suitable manner. The said sleeve K protects the cakes G' G' G' from the great heat of the tube C, and so confines the generation of the gas to the cake G immediately above the lamp.

To prevent the escape of gas at the outer end of the tube C, I provide one, two, or more india-rubber washers L, placed in the sleeve K and separated from each other by metal rings M, which are held in place by the screw-cap N. The washers tightly embrace the cake G' last introduced into the tube and produce a gas-tight joint therewith.

The cakes of oxygen-yielding substance are incased in asbestos, which prevents actual contact between the said substance and the hot tube, and hence the latter does not become fouled and is always in a condition for giving up its heat efficiently to the said substance.

The asbestos covering or casing preferably does not completely surround the oxygen-yielding substance, but a strip of the said substance is left uncovered, as indicated in Fig. 3.

P is a guide-rod secured to the box A and passing through an eye in an arm P' of a block $P^2$, secured to the chamber D. The said rod serves to guide the chamber D as it rises and falls in accordance with the addition and removal of gas to and from the holder B.

Q is a spring-controlled relief-valve placed in an opening in the block $P^2$, which opening communicates with the interior of the chamber D by a passage Q'. The stem $Q^2$ of the valve projects above the top of the block $P^2$ in position to strike a plate T, fixed on the top of the guide-rod P, when the gas-holder B is full, so that if more gas is generated than the holder is capable of holding the holder will expand until the stem $Q^2$ strikes the plate T, whereupon the valve will be opened and the surplus gas allowed to escape into the atmosphere. The stem of the valve is made of triangular section and the hole in which it works is circular, so that the gas can escape past the stem when the valve is open.

The use of small cakes, as above described, is very advantageous for optical-lantern purposes and for many other purposes, as the generation of the gas can thereby be effectively controlled, and their use is very simple and does not demand any particular skill on the part of the operator. The cakes are pushed into the tube one after the other, and after each cake is spent it is pushed into the chamber D, its place being taken by another cake. The rate at which the cakes are fed forward will within limits determine the speed of generation of the gas.

As before stated, the generation of the gas can always be relied upon, and the tube C does not become fouled, but is always preserved quite clean. The cakes can be conveniently and cheaply transmitted through the post without risk, and they, together with the simple apparatus above described, are a most effective substitute for the clumsy and dangerous gas-bags and gas-bottles that have been hitherto so commonly used.

I sometimes connect the cakes together by flexible strips of fabric to form a continuous chain of cakes, or I mount the cakes on a flexible band R, (see Fig. 4,) made of asbestos or other suitable material. In addition to being mounted on the band R the cakes may be further separately covered with asbestos to prevent contact of the same with the sides of the hot tube. The said tube need not necessarily be round, but may have any suitable cross-section adapted to the shape of the cakes.

The chain of cakes may be pushed into the tube as required by hand or by means of a train of clockwork, one wheel of which is adapted to engage with the cakes and to feed them regularly into the tube.

I sometimes attach to the end of the cakes a piece U (see Fig. 7) of asbestos, porcelain, or other bad conductor of heat to separate the cakes and prevent the too ready conduction of heat from one to the other, whereby I avoid the generation of oxygen from those cakes which are not advanced to the hottest part of the tube. For the same purpose I sometimes apply caps V, Fig. 8, to the ends of the cakes, the said caps being made of non-conducting material and so arranged that there is an air-space between the caps and the ends of the cakes.

In some instances the receptacle D is dispensed with and the cakes are passed out of the end of the tube through washers similar to the washers L. In other instances a closed chamber similar to the chamber D is provided at each end of the tube, and in that case the cakes are fed forward as required by means of a wheel or similar device rotated by hand or by clockwork. The said chambers are furnished with doors or covers to admit of charging the apparatus with a fresh chain of cakes and of removing the spent cakes when the same are exhausted. In some instances the cakes would be mounted on an endless band.

In Figs. 5 and 6 I have shown an alternative mode of introducing the cakes into the generating-tube, while preventing the escape of gas therefrom. In these figures, W is a tube closed at both ends and arranged to slide through a long stuffing-box or chamber W', applied to the end of the generating-tube C. $W^2$ is a slot or opening in the side of the tube W large enough to admit a cake G. $W^3$ is a push-plate on the inner end of the tube W. To pass a cake G of oxygen-yielding substance into the generating-tube, the said cake is first passed through the slot $W^2$ into the tube W, and then the latter is pushed forward into the generating-tube and turned round until the slot $W^2$ is at the bottom, whereupon the cake G drops out of the tube W into the generating-tube. The tube W can then be drawn back and turned to receive another cake G.

When the tube W after being drawn out is turned to bring the slot to the top, the push-plate $W^3$ passes behind the end of the cake G last introduced into the tube, so that when next the tube W is advanced it pushes forward the said cake and makes room for the next cake. The stuffing box or chamber W' must be longer than the slot $W^2$ to prevent the escape of gas when the tube W is being moved in and out.

In lieu of dropping the cake out of the tube W in the manner described as soon as it is introduced I may retain it in the tube W until it is exhausted and then either withdraw the tube W, remove the spent cake, and substitute a fresh cake, or discharge the spent cake into the tube C, then withdraw the tube W, recharge it with another cake, and push the tube W in again.

In some instances in lieu of making up the oxygen-yielding substance into cakes, as above described, I use it in the form of powder or crystals, and I provide a traveling band furnished with cups or receptacles which can be caused to pass through the heating-tube C. The powder or crystals is or are fed into the said cups or receptacles from a hopper or otherwise in accordance with the requirements.

What I claim is—

1. As a new article of manufacture, a cake of oxygen-yielding material provided with a covering that is non-conductive of heat, substantially as and for the purposes specified.

2. The combination with a gas-receiver, a tubular generator connected with the receiver, and means for heating the generator, of an asbestos sleeve K secured in one end of said generator, elastic washers L and metal rings M inserted in the outer end of said sleeve and adapted to closely embrace the last of a series of cakes of oxygen-yielding material placed in said sleeve, and a cap N closing the outer end of said generator and the sleeve therein, substantially as described.

3. The combination of an expansible gas-holder, a generator for oxygen gas, a chamber for receiving spent material from said generator and a lamp for heating the generator, the said chamber, generator and lamp being mounted on the expansible gas-holder and serving to weight the same, substantially as described.

4. The combination of an expansible gas-holder, a generator for oxygen gas, a chamber or box communicating with one end of said generator to receive gas and spent material from the generator, a pipe connecting the upper part of said chamber with the gas-holder, a relief-valve for said chamber, a lamp for heating the generator, the said chamber, generator and lamp being mounted on the expansible gas-holder, and means for automatically opening the relief-valve as the gas-holder attains its limit of expansion, substantially as described.

In testimony whereof I have hereunto set my hand this 4th day of November, 1895.

ALFRED SWEETSER.

Witnesses:
PERCY H. BUDGEN,
JOSEPH LAKE.